(12) United States Patent
Alshawabkeh et al.

(10) Patent No.: US 11,568,173 B2
(45) Date of Patent: Jan. 31, 2023

(54) METHOD AND APPARATUS FOR PROCESSING TEST EXECUTION LOGS TO DETREMINE ERROR LOCATIONS AND ERROR TYPES

(71) Applicant: EMC IP HOLDING COMPANY LLC, Hopkinton, MA (US)

(72) Inventors: Malak Alshawabkeh, Franklin, MA (US); Motasem Awwad, Franklin, MA (US); Samer Badran, Wakefield, MA (US); Swapnil Chaudhari, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 377 days.

(21) Appl. No.: 16/892,347

(22) Filed: Jun. 4, 2020

(65) Prior Publication Data
US 2021/0383170 A1 Dec. 9, 2021

(51) Int. Cl.
*G06F 11/00* (2006.01)
*G06F 9/44* (2018.01)
(Continued)

(52) U.S. Cl.
CPC .......... *G06K 9/6259* (2013.01); *G06F 11/006* (2013.01); *G06F 11/3692* (2013.01);
(Continued)

(58) Field of Classification Search
CPC .. G06K 9/6259; G06K 9/6282; G06K 9/6267; G06K 9/6256; G06K 9/62;
(Continued)

(56) References Cited

U.S. PATENT DOCUMENTS 11,113,175 B1 * 9/2021 Adamo ................. G06F 40/216
2015/0347923 A1 * 12/2015 Bartley ............... G06F 11/0709
706/12
(Continued)

OTHER PUBLICATIONS

Andrew DeOrio et al., Machine Learning-based Anomaly Detection for Post-silicon Bug Diagnosis, 2013, [Retrieved on Nov. 18, 2022] . Retrieved from the internet: <URL: https://ieeexplore.ieee.org/stamp/stamp.jsp?arnumber=6513558> 6 Pages (1-6) (Year: 2013).*
(Continued)

*Primary Examiner* — Anibal Rivera
(74) *Attorney, Agent, or Firm* — Anderson Gorecki LLP

(57) ABSTRACT

A method of processing test execution logs to determine error location and source includes creating a set of training examples based on previously processed test execution logs, clustering the training examples into a set of clusters using an unsupervised learning process, and using training examples of each cluster to train a respective supervised learning process to label data where each generated cluster is used as a class/label to identify the type of errors in the test execution log. The labeled data is then processed by supervised learning processes, specifically a classification algorithm. Once the classification model is built it is used to predict the type of the errors in future/unseen test execution logs. In some embodiments, the unsupervised learning process is a density-based spatial clustering of applications with noise clustering application, and the supervised learning processes are random forest deep neural networks.

18 Claims, 6 Drawing Sheets

(51) Int. Cl.
*G06K 9/62* (2022.01)
*G06F 11/36* (2006.01)
*G06N 3/04* (2006.01)
*G06F 40/30* (2020.01)
*G06N 3/08* (2006.01)

(52) U.S. Cl.
CPC ........... *G06F 40/30* (2020.01); *G06K 9/6223* (2013.01); *G06K 9/6282* (2013.01); *G06N 3/0454* (2013.01); *G06F 11/3608* (2013.01); *G06F 11/3684* (2013.01); *G06F 11/3688* (2013.01); *G06K 9/6215* (2013.01); *G06K 9/6227* (2013.01); *G06K 9/6228* (2013.01); *G06K 9/6256* (2013.01); *G06K 9/6263* (2013.01); *G06K 9/6267* (2013.01); *G06K 9/6269* (2013.01); *G06N 3/088* (2013.01)

(58) Field of Classification Search
CPC .. G06K 9/6215; G06K 9/6227; G06K 9/6228; G06K 9/6263; G06K 9/6269; G06F 40/30; G06F 40/216; G06F 11/006; G06F 11/3692; G06F 11/079; G06F 16/285; G06F 11/3688; G06F 11/3684; G06F 11/3447; G06F 11/3608; G06N 3/0454; G06N 3/08; G06N 3/088; G06N 20/00; G06N 3/04

See application file for complete search history.

(56) References Cited

U.S. PATENT DOCUMENTS

| | | | |
|---|---|---|---|
| 2019/0340512 A1* | 11/2019 | Vidal | G06F 11/3664 |
| 2020/0210556 A1* | 7/2020 | Lee | G06N 3/0454 |
| 2020/0293886 A1* | 9/2020 | Han | G06V 10/764 |
| 2021/0064518 A1* | 3/2021 | Abu Taha | G06F 11/3688 |
| 2021/0279562 A1* | 9/2021 | Cmielowski | G06N 20/20 |
| 2021/0357808 A1* | 11/2021 | Tsuyuki | G06K 9/6227 |

OTHER PUBLICATIONS

Chuck Rosenberg et al., Semi-Supervised Self-Training of Object Detection Models, 20005, [Retrieved on Nov. 18, 2022], Retrieved from the internet: <URL: https://kilthub.cmu.edu/articles/journal_contribution/Semi-Supervised_Self-Training_of_Object_Detection_Models/6560834> 8 Pages (1-8) (Year: 2005).*

* cited by examiner

FIG. 6

| X (input) | | | Y (output) | |
|---|---|---|---|---|
| Feature #1 (word #1) | Feature #2 (word #2) | ● ● ● | Error Type | |
| 0.166 | 0.800 | ● ● ● | oFxx2w | Training Examples for Cluster #A 460₁ |
| 0.298 | 0.948 | ● ● ● | oFxx2Q | |
| 0.288 | 0.625 | ● ● ● | oFxx2X | |
| 0.227 | 0.748 | ● ● ● | oFxx2w | |
| 0.189 | 0.813 | ● ● ● | oFxx2x | |
| 0.212 | 0.994 | ● ● ● | oFxx1D | |
| 0.284 | 0.815 | ● ● ● | oFxx1X | |

| X (input) | | | Y (output) | |
|---|---|---|---|---|
| Feature #1 (word #1) | Feature #2 (word #2) | ● ● ● | Error Type | |
| 0.769 | 0.099 | ● ● ● | DFyz3r | Training Examples for Cluster #B 460₂ |
| 0.882 | 0.454 | ● ● ● | DFyx3w | |
| 0.941 | 0.348 | ● ● ● | DFyz3x | |
| 0.985 | 0.448 | ● ● ● | DFyy2p | |
| 0.810 | 0.125 | ● ● ● | DFyz2p | |

| X (input) | | | Y (output) | |
|---|---|---|---|---|
| Feature #1 (word #1) | Feature #2 (word #2) | ● ● ● | Error Type | |
| 0.811 | 0.745 | ● ● ● | E2nr4w | Training Examples for Cluster #C 460₃ |
| 0.705 | 0.825 | ● ● ● | E2nr4z | |
| 0.991 | 0.981 | ● ● ● | E2nr3g | |
| 0.895 | 0.911 | ● ● ● | E2nr3t | |
| 0.812 | 0.732 | ● ● ● | E2nr4p | |

METHOD AND APPARATUS FOR PROCESSING TEST EXECUTION LOGS TO DETREMINE ERROR LOCATIONS AND ERROR TYPES

FIELD

This disclosure relates to computing systems and related devices and methods, and, more particularly, to a method and apparatus for processing test execution logs to determine error locations and error types.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of processing test execution logs to determine error locations and error types includes creating a set of training examples based on previously processed test execution logs, clustering the training examples into a set of clusters using an unsupervised learning process to label data where each generated cluster is used as a class/label to identify the type of errors in the test execution log. The labeled data is then processed by supervised learning processes, specifically a classification algorithm. Once the classification model is built it will be used to predict the type of the errors in future/unseen test execution logs. In some embodiments, the unsupervised learning process is a density-based spatial clustering of applications with noise clustering application, and the supervised learning processes are random forest deep neural networks.

BRIEF DESCRIPTION OF THE DRAWINGS

FIG. 6 is a functional block diagram of a set of example data structures, each data structure containing a set of training examples associated with a given cluster, each training example including a set of independent variables (features) and a dependent variable (error type label), according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
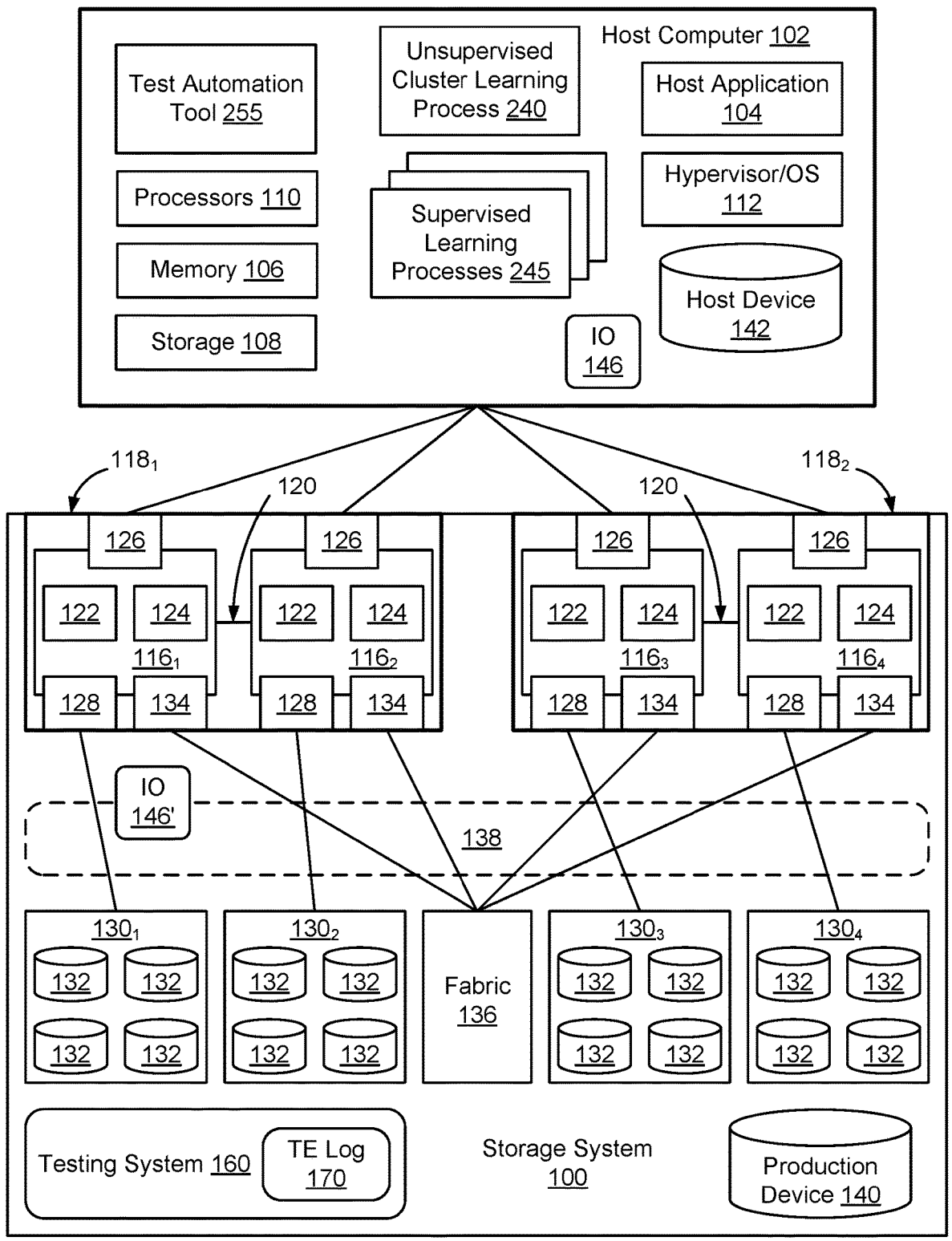
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies, for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect Express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, test automation applications, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

As is clear from FIG. 1, storage systems are complex systems and may be configured in multiple ways to manage data stored in drives 132 and to provide access to that data. Each time a new feature is implemented on the storage system 100, an existing feature is changed, or the configuration of the storage system 100 is changed, it is necessary to extensively test the storage system to ensure it is operating properly. Additionally, since storage systems 100 often interact with other storage systems, for example to enable data to be replicated at multiple locations, additional testing is often used to ensure that sets of storage systems are properly configured and are interacting as required. For example, if a RDF (Remote Data Forwarding) application 124 is to be used to mirror a portion of the data stored in drives 132 to a second storage system 100, the mirroring environment will need to be tested to ensure that data is being properly copied between the two storage systems 100. Even a minor change in an application flow or addition of any newly developed code can seriously affect the execution of the storage system 100 or the operation of the storage system in a storage environment.

In some embodiments, one of the applications that is running on one of the hosts 102 is a test automation tool 255 that is used to generate tests and review test results. The tests, in some embodiments, are containers of cloud resources and workflow definitions that operate on those resources, and specify the type of operations to be performed on the storage systems 100 of a storage environment. Once defined, the tests are dispatched to an automation tools server in the storage environment that implements the tests on the storage systems 100.

The result of a test, in some embodiments, is a pass/fail indication. When a test fails, a test error log 170 of the operations that occurred on the storage system is provided, e.g. to the test automation tool 255, and the test error log 170 is used to determine the type of failure and the reason for the test failure.

The test automation tool 255 allows users to generate a wide range of automated test cases that can effectively test combinations of several storage system features, such as local/remote replication, snapshot creation, deduplication, etc. The testing requirements of these features are complex, and demand fast methods to get test results and quickly tag failures/errors as either commonly known in the test floor or newly generated. In addition, it is desirable to accurately determine the source of the failure, such as whether the failure was caused by a microcode fix and therefore needs to be debugged, or whether the failure was due to a flaw in the test itself, i.e. by the test-case execution steps.

Existing methods of reviewing test results are tedious and time consuming. Specifically, the existing process involves lots of human involvement to dig through and search long test execution logs 170 for the existence of errors, and then correlate logged errors with a likely source of the error (error type). Depending on the number of deployed storage systems 100 being tested, and the number of tests being run on the set of deployed storage systems 100, it is possible for hundreds or thousands of errors to be reported weekly. This requires an extensive amount of manual labor to sift through the test execution logs 170, analyze the reasons for the test failures, and identify critical error events.

According to some embodiments, an automated error analysis system is provided that digests massive test execution log files 170, creates clusters of similar errors with similar symptoms, and correlates the error clusters to failure events. A set of supervised machine learning processes are then trained (one supervised machine learning process for each cluster) to learn a regression between error characteristics and failure probability. Once trained, the automated error analysis system is able to locate and classify errors in test execution logs 170, and provide the error location and predicted type to the test automation tool, to facilitate review of the test execution logs 170 such that errors associated with test failures are quickly and automatically triaged.

As discussed in greater detail herein, in some embodiments a test execution log analysis system is provided that is configured to collect error logs and use machine learning to determine the location and type of errors contained in the error logs. In some embodiments, the test execution log analysis system provides predictive text-mining methods to analyze logs from multiple systems and determine signatures of defects and errors. In some embodiments, the test execution log analysis system has two phases—data collection and machine learning.

As shown in FIG. 1, in some embodiments one of the host applications 104 is a test automation tool 255 configured to enable test results to be reviewed, for example by processing TE (Test Error) logs 170 generated by automated tests executing in testing system 160 on the storage systems 100 and hosts 102. The test automation tool 255 is associated with an unsupervised cluster learning process 240 and a set of supervised learning processes 245 (one for each cluster) that are used to categorize and predict error types from the test error logs 170. Although FIG. 1 shows both the test automation tool 255 and the learning processes 240, 245 implemented on the same host 102, in some embodiments the test automation tool 255 and learning processes 240, 245 are implemented on separate hosts 102 or on a stand-alone computer not affiliated with or connected to storage system 100.

Figure 2:
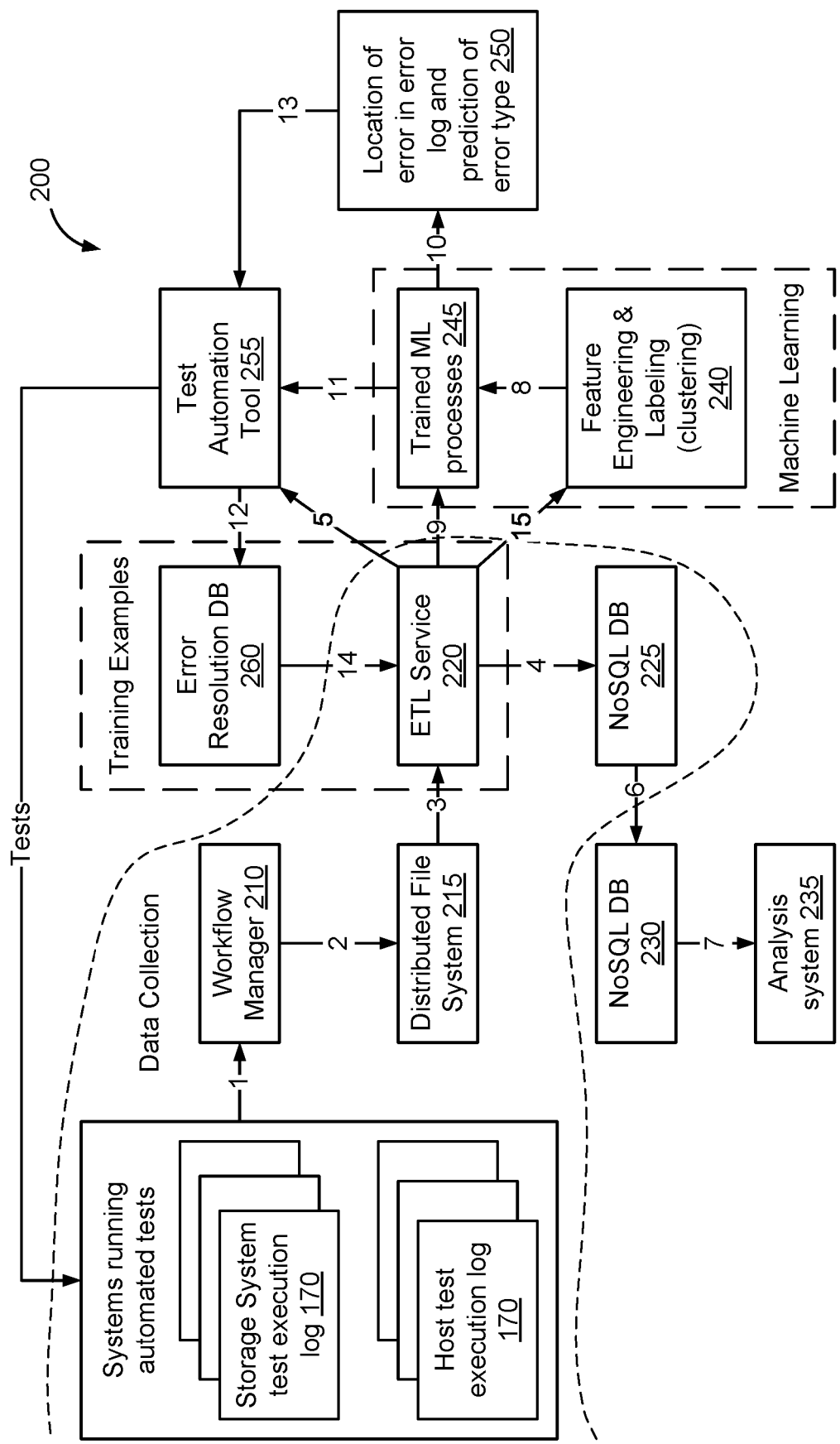
FIG. 2 is a functional block diagram of an example test environment configured to test storage systems and hosts, collect error logs, and process the error logs using machine learning processes, according to some embodiments.

FIG. 2 is a functional block diagram of an example test environment 200. In some embodiments, the test environment 200 includes a test automation tool 255 configured to dispatch tests to a set of systems such as storage systems 100 and hosts 102. As the systems execute the tests, test execution logs 170 are created, which are passed back to test automation tool 255 for analysis.

In some embodiments, a data pipeline, implemented using workflow manager 210, is used to extract (arrow 1) and digest the test execution logs 170. In some embodiments, the workflow manager places the test execution logs 170 in a kafka buffer. The test execution logs 170 are then read from the kafka buffer and forwarded (arrow 2) to a persistent Hadoop distributed file system cluster 215. An ETL (Extract Transform Load) service 220 retrieves the test execution log files 170 from the distributed file system cluster 215 (arrow 3). The ETL service 220 parses the test execution logs 170, cleanses the data, and stores the parsed test execution logs 170 in a structured format in a no-SQL database 225 (arrow 4). In some embodiments, the ETL service 220 passes the test execution log files 170 to the test automation tool 255 (arrow 5).

In some embodiments, by parsing the test execution logs 170, the ETL service 220 is able to extract important features from the test execution logs 170 using statistical text mining algorithms such as bag-of-words, TF-IDF, Doc2Vec, etc. Optionally, as shown in FIG. 2, the files stored in the no-SQL database 225 may be copied (arrow 6) to an external no-SQL database 230 for data analysis purposes. For example, in some embodiments an analysis system 235 uses (arrow 7) the test execution logs 170 to create tables/report/graphs based on the parsed test execution logs, to show the types of errors that have been identified by the automated testing system.

As shown in FIG. 2, in some embodiments the test execution log analysis system includes a group of machine learning processes 240, 245 configured to perform feature extraction and labeling, model classification, and prediction. In some embodiments, feature extraction and labeling is implemented using an unsupervised clustering machine learning process 240, and model classification and prediction is implemented by training a set of machine learning processes 245, such as random forest learning processes—one random forest for each cluster.

In some embodiments, the prediction aspect is implemented by parsing a new log file using ETL service 220, classifying the new test execution log 170 using the unsupervised clustering machine learning process 240, and then using a selected one of the trained set of machine learning processes 245 to generate a location of an error in an test execution log 170 and a predicted error type 250. Optionally, as shown in FIG. 2, when a new test execution log 170 is processed, in addition to generating the prediction 250, the new test execution log 170 is forwarded (arrow 11) to the test automation tool 255. If the error is able to be classified by the trained machine learning process 245, the output of the trained machine learning process 245, namely the location of an error in the test execution log and a predicted error type 250, is forwarded to the test automation tool 255 (arrow 13) to be processed by the test automation tool 255 in the context of the test execution log 170. If the test execution log 170 contains a new error type that prevents the trained machine learning process 245 from determining the location and/or type of error contained in the test execution log 170, once the test execution log 170 has been processed by a person using the test automation tool 255 and labeled, the labeled test execution log 170 can be used as a training example to refine the trained machine learning process 245.

Although an embodiment will be described in which live test execution logs 170 are clustered using the unsupervised clustering machine learning process 240, and then used to train the set of machine learning processes 245, in some embodiments historic test execution logs 170 and resolutions (labeled error determinations) are stored in a historic error resolution database 260. In some embodiments, the previous test execution logs 170 and error resolutions (labels) are passed (arrow 14) to the ETL service 220 and used to create training examples that are used to train the set of machine learning processes 245. The ETL service 220 processes the historic test execution logs 170 and resolutions in the same manner as labeled current test execution logs 170. In some embodiments, the historic test execution logs include an error classification and error resolution, as determined by a person using the test automation tool 255 when the person analyzed the previous test execution log file 170. Each historic test execution log 170 and associated resolution (label) is provided to the clustering process 240 to be assigned to one of the clusters, and then used as a training example to train a respective one of the supervised machine learning processes 245 associated with the selected cluster.

Figure 3:
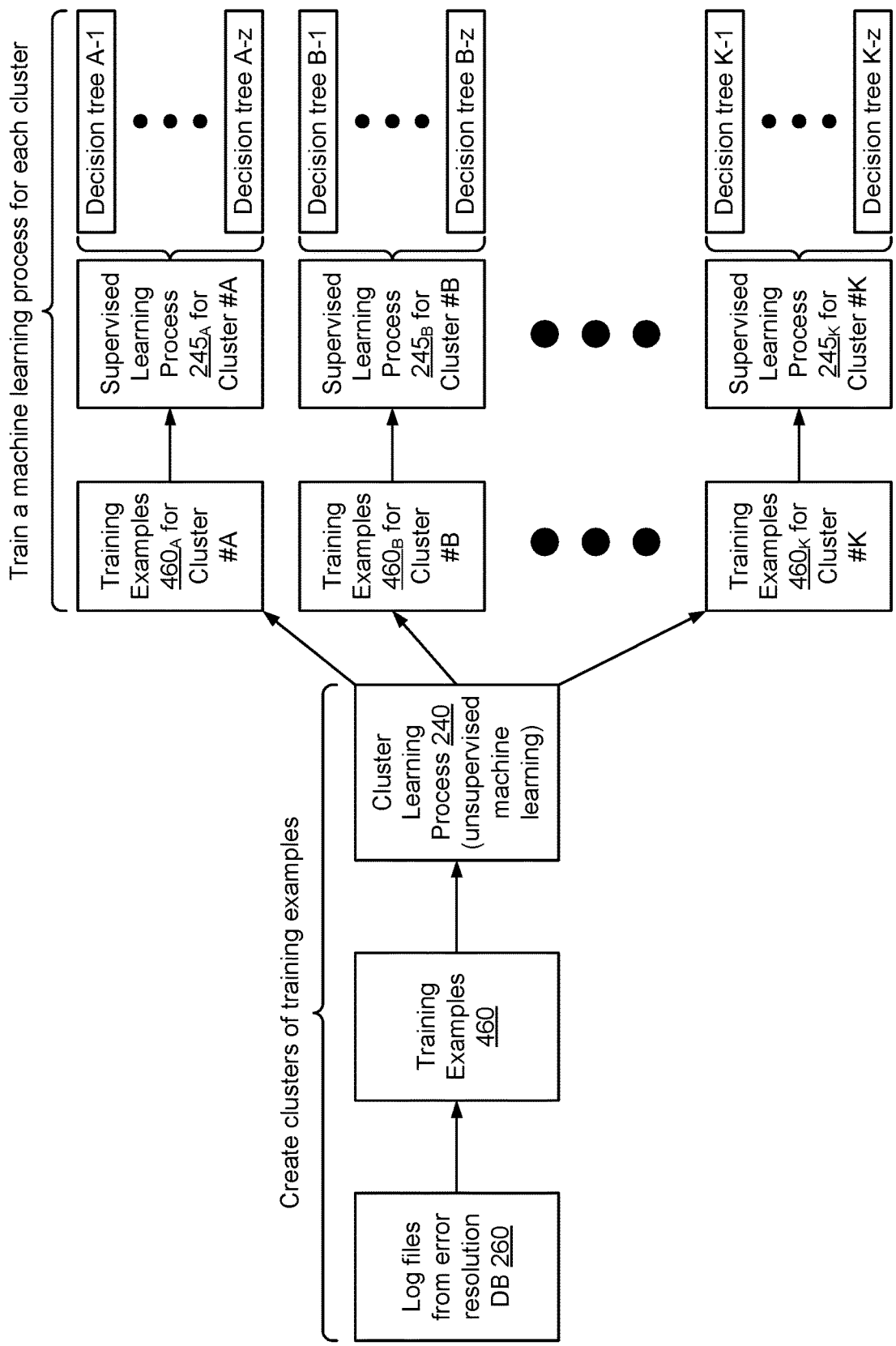
FIG. 3 is a functional block diagram of a method of training a set of supervised learning processes to implement a method of processing test execution logs to determine error locations and error types, according to some embodiments.

FIG. 3 is a functional block diagram of an example test execution log analysis system configured to train a set of supervised learning processes to implement a method of processing test execution logs to determine error location and error type, according to some embodiments. As shown in FIG. 3, in some embodiments the process has two phases—phase one during which clusters of training examples $260_A$-$260_K$ are created, and phase two during which the clusters of training examples $260_A$-$260_K$ are used to train respective supervised machine learning processes $245_A$-$245_K$—one for each cluster. The two phases can happen separately or in tandem, depending on the embodiment.

Figure 4:
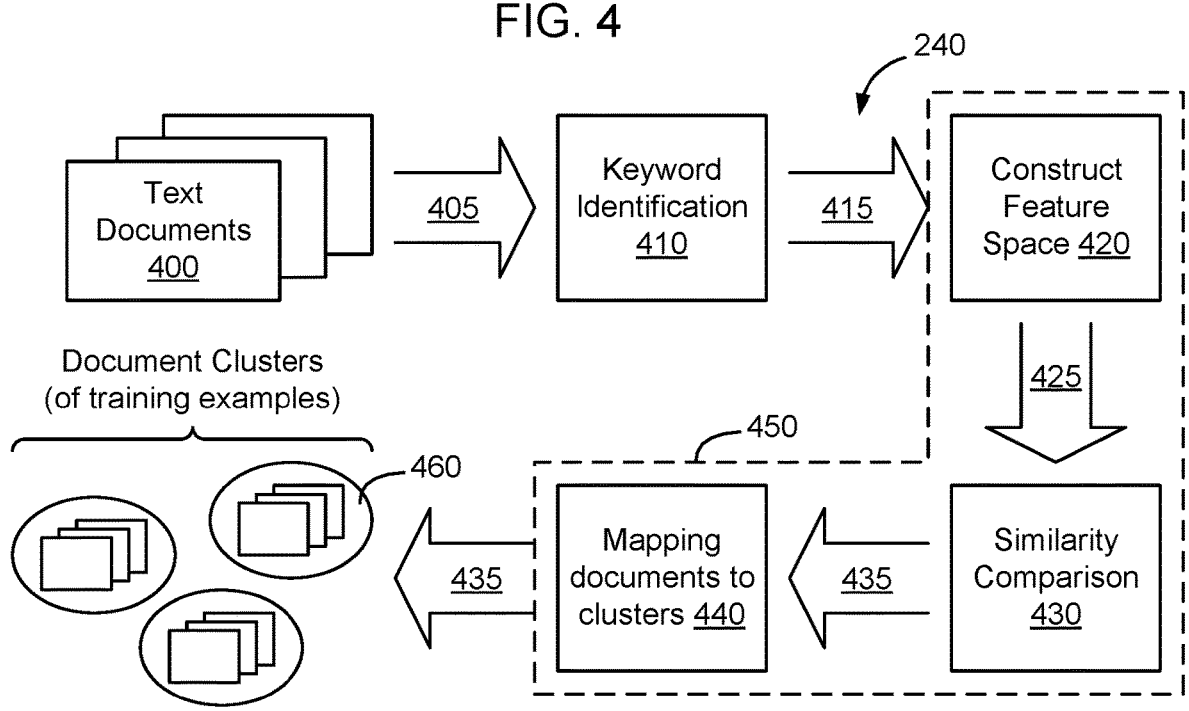
FIG. 4 is a functional block diagram of a process of creating and clustering training examples for use in training the set of supervised learning processes of FIG. 3, according to some embodiments.

FIG. 4 is a functional block diagram of a process of creating and clustering training examples for use in training the set of supervised learning processes of FIG. 3, according to some embodiments.

Figure 5:
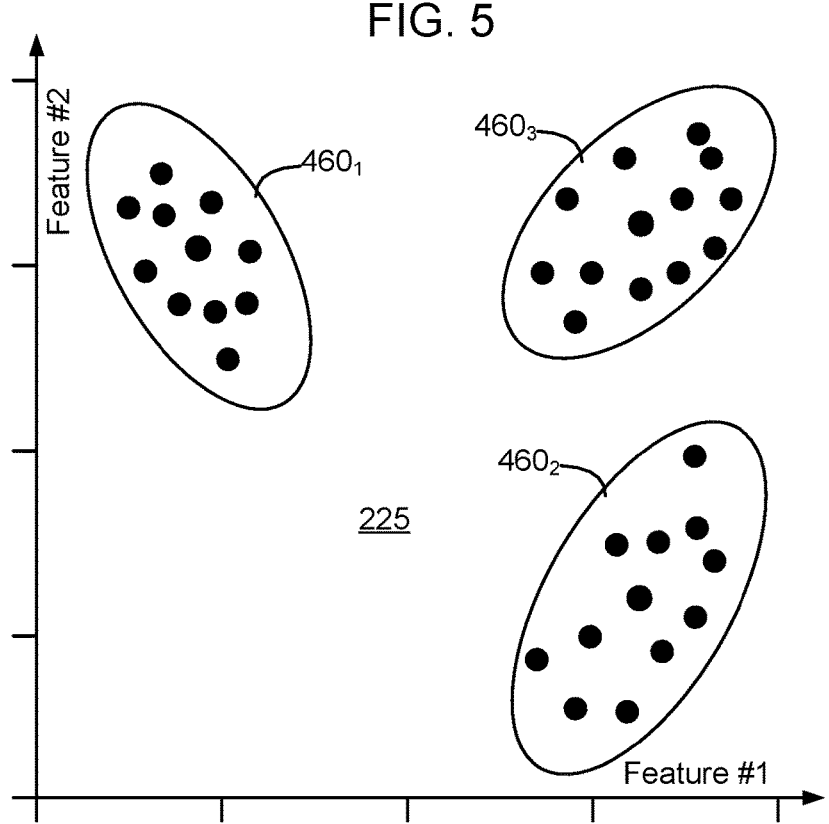
FIG. 5 is a graph showing an example clustering of training examples based on test execution log features using an unsupervised cluster learning process, according to some embodiments.

Clustering is a machine learning task of grouping a set of examples in such a way that the examples in the same group (referred to herein as a cluster) are more similar to each other than those in other groups of instances (other clusters). As shown in FIG. 2, the training examples are input to a cluster learning process 240 which, in some embodiments, is an unsupervised machine learning process. The cluster learning process 240 assigns the training examples to a set of K clusters, in which K is an integer greater than one (K≥2). In some embodiments, the unsupervised machine learning process assigns the training examples to between 5 and 20 clusters (5≤K≤20), although the number of clusters can vary depending on the implementation. FIG. 5 is a graph showing an example clustering of training examples based on two test execution log features (feature #1 and feature #2) using an unsupervised cluster learning process. In the example shown in FIG. 5, three clusters were determined to exist in the set of training examples based on the set of features (i.e. K=3 in the example shown in FIG. 5). Accordingly, as shown in FIG. 2, the cluster learning process 240, in some embodiments, assigns the training examples to sets, with each set of training examples belonging to exactly one cluster. In FIG. 2 the training examples are assigned to K sets of training examples $260_A$-$260_K$.

As shown in FIG. 4, in some embodiments text documents 400 created from the test execution logs 170 (from the ETL service 220) are provided (arrow 405) to a keyword identification process 410. There are multiple types of keyword identification processes that may be used. For example, a bag-of-words model may be created from a text documents, in which the bag-of-words model is a representation of text that describes the occurrence of words within a document. The bag-of-words model generally includes both a vocabulary of known words and a measure of the presence of the known words. Another keyword identification process that may be used is a TF-IDF (Term Frequency-inverse Document Frequency) process, which is a numerical statistic that is intended to reflect how important a word is to a document in a collection of documents. Another keyword identification process that may be used is Doc2Vec, which creates a numerical representation (vector) from an input document. Many types of keyword identification processes 410 that are able to identify the content of the words of the text documents 400 created from the parsed test execution logs 170 may be used depending on the implementation.

Once the keyword processing is complete, the output file (arrow 415) is passed to a DBSCAN (Density-Based Spatial Clustering of Applications with Noise) clustering process 450. In some embodiments, the DBSCAN process includes three components—feature space construction 420, similarity comparison 430, and the actual clustering process 440. Specifically, the feature space is first constructed, in which several features of the keyword documents are selected to be used in the clustering process 440. A similarity comparison process 430 is used to compare the text documents for similarity with each other when viewed in the context of the feature space. Text documents that are similar within the context of the selected feature space are grouped using clustering process 440 to output a set of document clusters 460.

In some embodiments, the DBSCAN process 450 views the documents in the context of the feature space and defines a connectivity radius R surrounding each point. A cluster is formed from those points that are within the radius R of each other within the feature space. All points that are not within radius R of another point within a given cluster are classified as outliers. The DBSCAN process 450 thus determines how many clusters exist (determines K) within the feature space, and creates clusters of documents that include all points that are within radius R of each other in the feature space. Points that are not within radius R of any given set of other points are considered noise and ignored. In some embodiments, clustering the training examples into a set of clusters using an unsupervised learning process is implemented to label data, where each generated cluster is used as a class/label to identify the type of errors in the test execution log.

FIG. 5 shows an example clustering in which there are two features of interest (feature #1 and feature #2). Each dot in FIG. 5 represents a text document 400. The DBSCAN process 450, in this instance, has determined that the text documents 400 logically form three clusters, $460_1$, $460_2$, and $460_3$.

For example, assume that the feature space was composed such that feature #1 was related to the occurrence of the word "drive" in the test execution log 170, and feature #2 was related to the occurrence of the word "failure" in the test execution log 170. Cluster $460_1$ groups together a set of text documents 400 that often contain the word "failure" but rarely contain the word "drive". It may be inferred that these text documents 400 are associated with test execution logs 170 that more likely relate to failures other than drive failures. Cluster $460_2$ groups together a set of text documents 400 that often contain the word "drive" but are less likely to contain the word "failure". It may be inferred that these text documents 400 are associated with test execution logs 170 that more likely relate to drive errors other than drive failures. Cluster $460_3$ groups together a set of text documents 400 that often contain both the word "drive" and the word "failure". It may be inferred that these test execution logs are likely are associated with test execution logs 170 that are related to drive failures. Accordingly, as shown in FIGS. 4-5, by using a clustering process it is possible to cluster text documents 400 generated from test execution logs 170 that reported similar errors together.

FIG. 5 shows a feature space having only two dimensions (two features of interest). In an actual implementation there could be multiple features of interest such as between 5-10 features of interest that are used to form multiple clusters. Further, although FIG. 5 has been described in which the feature of interest is the prevalence of occurrence of particular words, other features may be based on combinations of words in a document, such as the existence of a combination of words in close proximity. Accordingly, multiple features may be used and the manner in which the features are constructed may differ according to the implementation.

Although some embodiments have been described in which the clustering is implemented using particular unsupervised machine learning algorithms, in other embodiments different unsupervised machine learning algorithms are used and, accordingly, the particular machine learning algorithm will depend on the particular implementation.

FIG. 6 shows an example set of data structures containing training examples that have been clustered according to features of interest. In FIG. 6, the training examples of cluster #A have a value of feature #1 $460_A$ between 0.1 and 0.3, and a value of feature #B between 0.6 and 1.0; training examples of cluster #2 $460_B$ have a value of feature #1 between 0.7 and 1.0, and a value of feature #2 between 0.0 and 0.5; and the training examples of cluster #C $460_C$ have a value of feature #1 between 0.7 and 1.0, and a value of feature #2 of between 0.7 and 1.0. Each training example also has a label identifying the type of error.

As shown in FIG. 3, each set (cluster) of training examples of FIG. 6 is used to train/test a separate respective supervised learning process 245 for the cluster. Thus, for example, the training examples in cluster #A $460_A$ are used to train and test a supervised learning process $245_A$ for cluster #A. The training examples in cluster #B $460_B$ are used to train and test a supervised learning process $245_B$ for cluster #B. The training examples in cluster #K $460_K$ are used to train and test a supervised learning process $245_K$ for cluster #K. By using training examples that have been clustered based on features of the error logs 170, training examples that contained similar error descriptions are grouped together. By using training examples with similar error log descriptions, it is possible to more accurately train the supervised learning processes $245_A$-$245_K$, to cause each supervised learning processes to learn a regression between keyword features of the test execution logs and the type of error experienced during the test.

In some embodiments, during a training phase the training examples 460 for a given cluster are obtained, in which each training example has a set of features and a label. The label is the type of error that was identified as being associated with the test execution log. For example, when a test execution log 170 is generated and reviewed by a person using the test automation tool 255 to determine a source of the error, the type of error that occurred is attached to the test execution log 170 as a label.

To train the supervised learning process 245, the features that were used in the clustering process are extracted from the test execution log 170 and provided along with the label to the supervised learning process 245. The supervised learning process learns a recursion between the features and the label (type of error) until the supervised learning process 245 converges to a trained state. In some embodiments, for each learning process 245, a first percentage of the training examples are used to train the learning process and a second percentage of the training examples are used to test the learning process during the training phase to determine if the learning process is sufficiently trained. The test examples are training examples that have not been seen before. For example, in some embodiments determination of the trained state can be implemented by testing the supervised learning process 245 using a previous unseen labeled test execution log 170, inputting the features of the test execution log 170 to the supervised learning process 245, and comparing the label output by the supervised learning process 245 with the label assigned to the test execution log 170. If the two are sufficiently consistent, the supervised learning process 245 may be considered sufficiently trained. In this manner, the learning process can be tested to ensure that the output provided by the learning process is accurate.

In some embodiments, the supervised learning processes $245_A$-$245_K$ are implemented as deep neural networks, although other types of supervised learning processes may be used as well depending on the implementation. Once the universe of training examples is assigned to subsets, i.e. labeled by the unsupervised learning process 240, each subset of training examples is used to train a separate supervised learning process 245. Stated differently, as shown in FIG. 3, a separate supervised learning process 245 is trained for each cluster, such that the labeled examples are used to train/test the learning process 245. In some embodiments, as shown in FIG. 2, a respective random forest such as a group of deep neural networks is used to implement the supervised learning process 245 for each cluster. In some embodiments, each trained learning process 245 is configured to implement a classification algorithm, such that once the classification model is built it can be used to predict the type of the errors in future/unseen test execution logs.

In some embodiments, as shown in FIG. 2, the supervised learning process for each cluster is implemented as a random forest, wherein each random forest includes a set of deep neural networks or other supervised machine learning processes. When a set of training examples is used to train a learning process, it is possible for bias in the training set to cause the learning process to learn an output incorporating that bias. To counteract this, it is possible to train multiple independent learning processes using different subsets of training examples or inputting the training examples to the multiple independent learning processes in different orders. Once trained, the set of learning processes (forest) associated with the cluster will each independently be used to predict an error type and error location in a test execution log. The set of outputs of the learning processes (forest) are then averaged together to provide an expected error type and location prediction 250. Thus, in some embodiments instead of using a single learning process for each cluster, a forest of learning processes (multiple independent trees) is trained for each cluster.

To explain how this might be implemented using deep neural networks, assume that training examples 1-20,000 are associated with cluster #1. Instead of using all 20,000 training examples to train/test one deep neural network for cluster #1, the 20,000 training examples may be split into four groups with training examples 1-5,000 being used to create/train deep neural network #1 for cluster #1, training examples 5,001-10,000 being used to create/train deep neural network #2 for cluster #1, training examples 10,001-15,000 being used to create/train deep neural network #3 for cluster #1, and training examples 15,001-20,000 being used to create/train deep neural network #4 for cluster #1. These four separately trained deep neural networks constitute a random "forest" for cluster #1. In FIG. 3, the set of separately trained deep neural network that make up the random forest would constitute one of the supervised learning processes 245 for a given cluster. Accordingly, in an embodiment with seven clusters, training the learning processes would result in seven independent random forests—one for each cluster.

Once the set of supervised learning process 245 are trained, when a new test execution log is to be evaluated and is assigned to the cluster, the test execution log is provided to each trained deep neural networks of the random forest associated with the selected cluster. Each deep neural network in the random forest will output an error type and location based on the input test execution log. The output of each of the deep neural networks in the random forest can be averaged to arrive at a determined error type and location from the learning process 245. By separately training independent neural networks or other machine learning processes, using subsets of training examples from the cluster, it is possible for bias in the output of one machine learning process to be counterbalanced by reverse bias of another of the machine learning process to thereby enable the random forest to arrive at a more consistent output value.

Although several embodiments have been described in which particular supervised machine learning processes 245 are implemented using random forests, it should be emphasized that other machine learning processes can be used that can be trained to regress (predict) a dependent variable (Y) from a set of independent variables (X). In this instance, the independent variables (X) are the features of the test execution logs 170. The dependent variable (Y) is the error label associated with the errors reported by the test execution logs. Example machine learning processes of this nature include various forms of deep neural networks amongst other forms of learning processes. In some embodiments, the learning process 210 is configured as a deep neural network using a supervised regression, which is used to regress (infer) a numeric target value (error type) from one or more input values (test execution log features).

Figure 7:
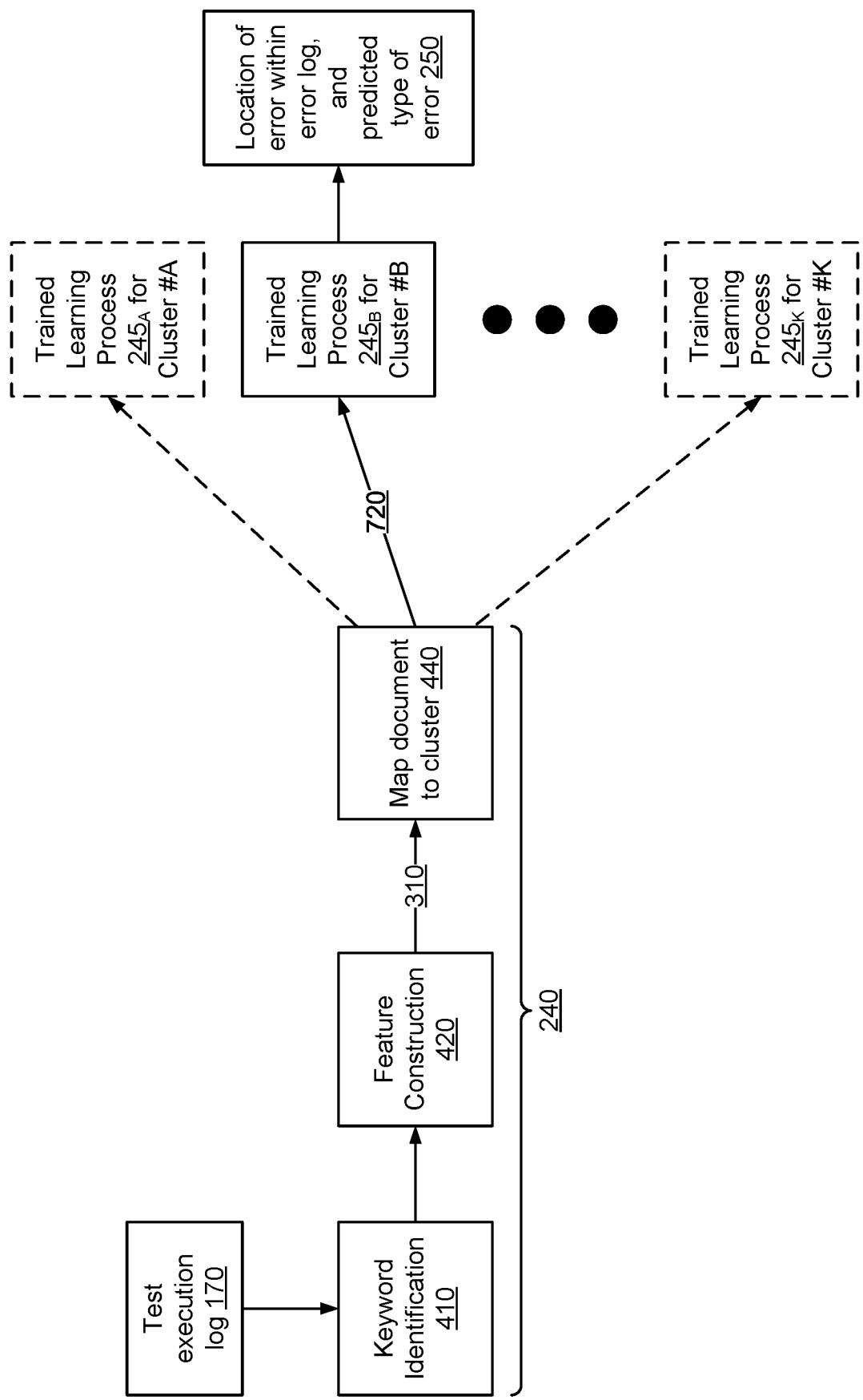
FIG. 7 is a functional block diagram of a method of using a set of trained learning processes to process a test execution log to determine error location and type, according to some embodiments.

FIG. 7 is a functional block diagram of a method of using a set of trained learning processes 245 to predict the error location and error type within a test execution log 170, according to some embodiments. As shown in FIG. 7, in some embodiments when a new test execution log 170 is received, the test execution log is passed to the clustering process 450 to be sorted into one of the clusters 460. In particular, the test execution log is passed to the keyword identification process 410, features that were used to perform clustering are then created in the document, and the features are used to map 440 the document to one of the clusters 460.

Once a cluster has been selected for the test execution log 170, the features of the test execution log are passed to the trained learning process 245 for that cluster. In the example shown in FIG. 7, it will be assumed that the proposed workload most closely fits within cluster #B. Accordingly, the test execution log 170 is passed (arrow 720) to the trained learning process $245_B$ for cluster #B, but is not passed to any of the other trained learning processes $245_A$ and $245_C$-$245_K$. The trained learning process $245_B$ for the selected cluster is used to determine a predicted error type and the location of the error within the test execution log 170.

It is possible for test execution logs to contain errors that have never previously been seen, or that have been seen insufficiently for the learning processes to learn a recursion between the features of the test execution logs and error type. Accordingly, in some embodiments if the learning process 245 does not identify a particular error, and the error is identified by a person using the test automation tool 255, once an error label is assigned to the test execution log 170 the test execution log is used to create an additional training example. The additional training example is used to continue training the learning process 245 for the selected cluster, to enable the learning process 245 to continue to improve over time by learning new error types and error signatures of the test execution logs 170.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of processing test execution logs to determine error locations and types, comprising:
   creating training examples from labeled test execution logs, the test execution logs describing actions that occurred in connection with execution of one or more tests on a storage system;
   clustering the training examples into two or more clusters based on features of the test execution logs using an unsupervised learning process;
   using the training examples of each cluster to train a separate respective supervised learning process for the cluster to learn a regression between features of the test execution logs and error types associated with the labels;
   assigning a new unlabeled test execution log to one of the clusters based on features of the new unlabeled test execution log; and
   using the trained supervised learning process for the respective one of the clusters to determine a label for the new unlabeled test execution log.

2. The method of claim 1, wherein the step of clustering is implemented using a DBSCAN (Density-Based Spatial Clustering of Applications with Noise) clustering process.

3. The method of claim 1, wherein creating training examples comprises parsing the test execution logs, performing a keyword identification on each of the test execution logs, constructing a feature space based on the keyword identification, and performing a similarity comparison between the training examples.

4. The method of claim 3, wherein the step of performing the keyword identification comprises extracting the features from the test execution logs using a statistical text mining algorithm.

5. The method of claim 4, wherein the statistical text mining algorithm is a bag-of-words algorithm.

6. The method of claim 1, wherein each separate respective supervised learning process is a deep neural network.

7. The method of claim 6, wherein each separate respective supervised learning process is a random forest of deep neural networks.

8. The method of claim 1, wherein the label is an error type and location of an error describe by the new unlabeled test execution log.

9. The method of claim 1, further comprising attaching the determined label to the new unlabeled test execution log.

10. A non-transitory tangible computer readable storage medium having stored thereon a computer program for processing test execution logs to determine error locations and types, the computer program including a set of instructions which, when executed by a computer, cause the computer to perform a method comprising the steps of:
    creating training examples from labeled test execution logs, the test execution logs describing actions that occurred in connection with execution of one or more tests on a storage system;
    clustering the training examples into two or more clusters based on features of the test execution logs using an unsupervised learning process;
    using the training examples of each cluster to train a separate respective supervised learning process for the cluster to learn a regression between features of the test execution logs and error types associated with the labels;
    assigning a new unlabeled test execution log to one of the clusters based on features of the new unlabeled test execution log; and
    using the trained supervised learning process for the respective one of the clusters to determine a label for the new unlabeled test execution log.

11. The non-transitory tangible computer readable storage medium of claim 10, wherein the step of clustering is implemented using a DBSCAN (Density-Based Spatial Clustering of Applications with Noise) clustering process.

12. The non-transitory tangible computer readable storage medium of claim 10, wherein creating training examples comprises parsing the test execution logs, performing a keyword identification on each of the test execution logs, constructing a feature space based on the keyword identification, and performing a similarity comparison between the training examples.

13. The non-transitory tangible computer readable storage medium of claim 12, wherein the step of performing the keyword identification comprises extracting the features from the test execution logs using a statistical text mining algorithm.

14. The non-transitory tangible computer readable storage medium of claim 13, wherein the statistical text mining algorithm is a bag-of-words algorithm.

15. The non-transitory tangible computer readable storage medium of claim 10, wherein each separate respective supervised learning process is a deep neural network.

16. The non-transitory tangible computer readable storage medium of claim 15, wherein each separate respective supervised learning process is a random forest of deep neural networks.

17. The non-transitory tangible computer readable storage medium of claim 10, wherein the label is an error type and location of an error describe by the new unlabeled test execution log.

18. The non-transitory tangible computer readable storage medium of claim 10, further comprising attaching the determined label to the new unlabeled test execution log.

* * * * *